Figure 1:
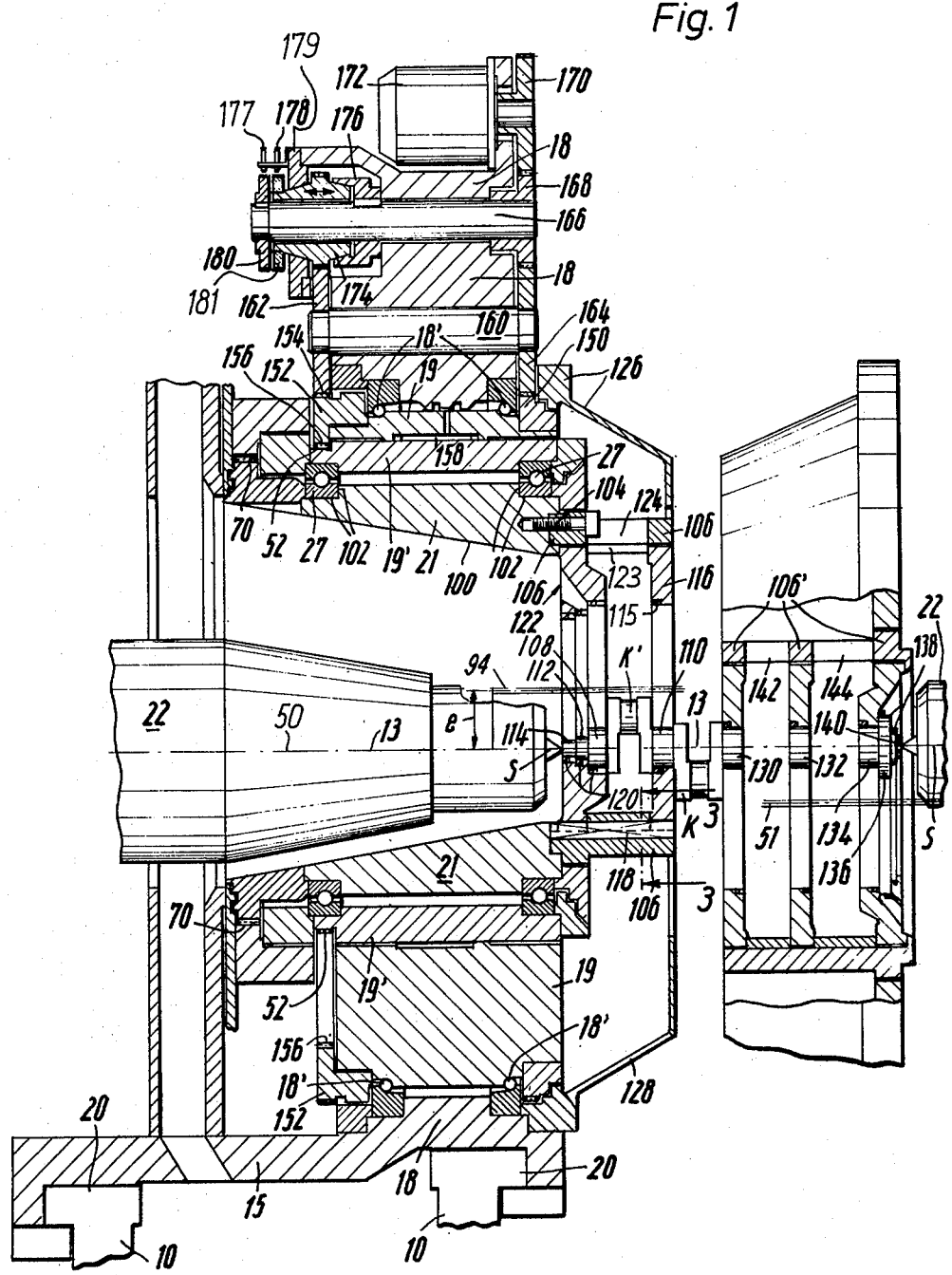

United States Patent [19]

Berbalk

[11] 4,090,422
[45] May 23, 1978

[54] TOOL MACHINE FOR MACHINING CRANK SHAFTS

[75] Inventor: Hermann Berbalk, Goppingen, Germany

[73] Assignee: Gebruder Boehringer Gesellschaft mit beschrankter Haftung, Germany

[21] Appl. No.: 741,519

[22] Filed: Nov. 12, 1976

[30] Foreign Application Priority Data

Nov. 14, 1975 Germany .......................... 2551250

[51] Int. Cl.² .......................... B23B 1/00; B23B 5/18
[52] U.S. Cl. ................................. 82/1 C; 82/9; 82/20
[58] Field of Search ........................ 82/9, 20, 1 C

[56] References Cited

U.S. PATENT DOCUMENTS

| 2,451,147 | 10/1948 | Beachler ........................ 82/9 |
| 2,494,797 | 1/1950 | Bugatti ........................... 82/9 |
| 3,795,161 | 3/1974 | Berbalk .......................... 82/20 |
| 3,880,025 | 4/1975 | Kralowetz et al. ............. 82/9 |

*Primary Examiner*—Leonidas Vlachos
*Attorney, Agent, or Firm*—Shlesinger, Fitzsimmons & Shlesinger

[57] ABSTRACT

The present invention relates to a tool machine of a known type in which a crankshaft is machined by a rotary annular tool having internal cutting edges located on at least one circle through which the crankshaft extends. The crankshaft is held by means mounted on the bed of the machine in stationary condition. A slide on this bed movable in a direction parallel to the crankshaft carries a tool unit which is movable on the slide to a cutting position in which said circle is located in a tangential relationship to the pin of the crankshaft being cut and to a loading and unloading position in which said circle is brought to co-axial relationship with the main axis of the crankshaft. When the tool unit is in this position, it may be moved by the slide to such a position close to one of the columns on the bed that the tool surrounds a substantially cylindrical projection on the column carrying the end of the crankshaft. In this position the tool unit is located beyond the end of the crankshaft permitting the same to be easily released from the clamping and centering means and unloaded from the machine which may then be charged with the next crankshaft. A second slide on the bed carries a second tool unit with the same equipment which in the loading and unloading position is located beyond the other end of the crankshaft. Each rotary annular tool may have internal cutting edges located on a plurality of co-axial spaced circles through which the crankshaft extends. Therefore, the tool of each tool unit is capable of simultaneously machining two or more co-axial sections of the crankshaft, such as the line bearing sections. Each tool comprises axially spaced annular cutting elements having internal cutting edges and mounted within an annular supporting body provided with apertures for the discharge of chips. Preferably the tool in one tool unit rotates in a direction opposite to the tool of the other tool unit. The tool is rotatably mounted within an eccentric body which in its turn is mounted within the tool unit for rotation whereby the cutting tool may be caused to orbit around the work. The eccentric body may be composed of relatively adjustable elements affording a variation of the distance of the tool axis from the axis of the eccentric body. This variation affords a possibility of roughing and finishing the work.

6 Claims, 3 Drawing Figures

TOOL MACHINE FOR MACHINING CRANK SHAFTS

BACKGROUND AND OBJECTS

The present invention represents a further development and improvement of a prior machine tool for machining a crankshaft as disclosed in the U.S. Pat. No. 3,795,161 granted on Mar. 5, 1974 jointly to the inventor of the instant case and to another inventor. The disclosure of such prior patent is to be considered part of the disclosure of the present invention. The present invention and the prior invention both relate to a machine tool for machining a plurality of co-axial cylindrical shaft surfaces, such as the journal surfaces of a crankshaft. For this purpose an annular milling tool is used which is provided with internal cutting edges and orbits during a machining operation about the axis of the shaft which constitutes the workpiece.

The present invention further relates to the annular rotary tool of the type having internal cutting edges for simultaneously machining a plurality of co-axial surfaces of the work.

The prior machine has two longitudinal slides which are displaceable on a guideway on a bed of the machine tool, the bed extending parallel to the axis of the workpiece to be machined. Each slide carries a tool unit comprising a cross-slide carrying the annular tool and driving means which rotate the tool about its own axis and at the same time cause the tool to orbit about the axis of the workpiece. In the case of the prior machine tool, each annular milling tool employed therein has only one circular set of internal cutting edges and can therefore machine only one cylindrical shaft surface at a time, a second surface being machined simultaneously by the tool unit mounted on the other longitudinal slide. Hence, it is not possible to machine more than two spaced line bearing shaft surfaces simultaneously with the prior annular tool on the prior machine tool. There is not room enough in that machine tool for placing the tool units so close enough to each other as would be generally required for the simultaneously machining of more than two co-axial line bearing shaft surfaces.

It is an object of the present invention to provide an annular milling tool of the kind described above capable of simultaneously machining at least four co-axially spaced cylindrical shaft surfaces, in particular the surfaces of the journals for the line bearings of a crankshaft.

It is a further object of the invention to provide a machine tool with an annular milling tool having internal cutting edges capable of simultaneously machining of at least two co-axially spaced cylindrical shaft surfaces, in particular the surfaces of the journals of the line bearings of a crankshaft.

In accordance with the present invention an annular milling tool for simultaneously machining a plurality of co-axially spaced shaft surfaces by the orbiting method has at least two circular sets of internal cutting edges with gaps for chip removal between said sets. It is possible to employ the annular milling tool according to the invention on the prior machine tool as described in U.S. Pat. No. 3,795,161. In this case all of the co-axially spaced cylindrical shaft surfaces of the journals on one half of a crankshaft can be simultaneously machined by the novel annular milling tool carried by the tool unit provided on one of the two longitudinal slides of the aforesaid machine tool and all the co-axially spaced cylindrical shaft surfaces of the journals on the other half of that crankshaft can be simultaneously machined by the novel annular milling tool carried by the tool unit provided on the other one of the two longitudinal slides.

The accuracy of machining may be increased by incorporating certain features into a machine tool which is operable with an annular milling tool according to the invention by the orbiting method. In accordance with a further feature of the invention such a machine tool is organized as follows. Means are provided for rigidly supporting the work shaft approximately at its centre in stationary condition. If the shaft is a crankshaft, it is preferred to provide means for causing the two annular milling tools to rotate about their respective axes in opposite directions and to arrange said axes so that they are spaced apart by 180° away from each other on their respective orbits during their rotation about the axis of the crankshaft. The bending moments exerted on the work by one of the two annular milling tools will then act on the workpiece in a direction opposite to that of the bending moments exerted by the other annular milling tool so that the bending and torsional stresses exerted on the workpiece during the milling operation are reduced.

Machining accuracy may also be increased by providing in a machine tool according to the invention means which make it possible for a workpiece to be machined in two stages, a rough-cutting stage and a finishing stage. It is desirable that these two stages should be performed on the same machine tool without making it necessary for the workpiece to be unclamped from its holder or holders. To this end, the eccenter body carrying the annular milling tool may be composed of an inner eccentric annular element and of an outer eccentric annular element, with means for angularly displacing both eccentric elements relative to one another. Such a composite eccenter body is known from the German Offenlegungsschrift No. 1,552,803 in connection with the machining of crankshafts. In this known arrangement, the outer eccentric element can be adjusted to move the annular milling tool to a position in which that tool is co-axial with the main axis of the crankshaft and can be passed lengthwise along the crankshaft. In the machine tool described in the prior patent above referred to, the cross-slide is used for the purpose of bringing the annular tool to such co-axial position. In order to make it possible for this known arrangements to be used for rough-cutting or for finishing, as desired, a motor driven shaft is connected by a first train of motion transmitting elements to one of the eccentric annular elements of the eccentric body and a second train of motion transmitting elements is connected to the other one, preferably with the inner one, of the two annular eccentric elements. A clutch is provided which may be so shifted as to optionally connect the second train of motion transmitting elements either with the motor driven drive shaft or with a stationary braking element. In the latter alternative the second train of motion transmitting elements and the inner annular eccentric elements are arrested while the outer annular eccentric element is turned by the drive shaft so as to change the eccentricity of the composite eccentric body. This eccentricity, i.e. the distance of the axis of rotation of the eccentric body from the axis of rotation of the annular tool, determines the diameter of the workpiece.

By virtue of this selective change-over, it is possible when rough-cutting a cylindrical surface to leave enough material below that surface to allow it to be finished without great cutting forces being required, so that the elastic deformations of the workpiece and tool will be negligible.

If the machine tool according to the invention is so designed that the clutch can be engaged and disengaged during machining, then the change-over from rough-cutting to finishing can take place without interrupting the cutting operation.

Figure 2:
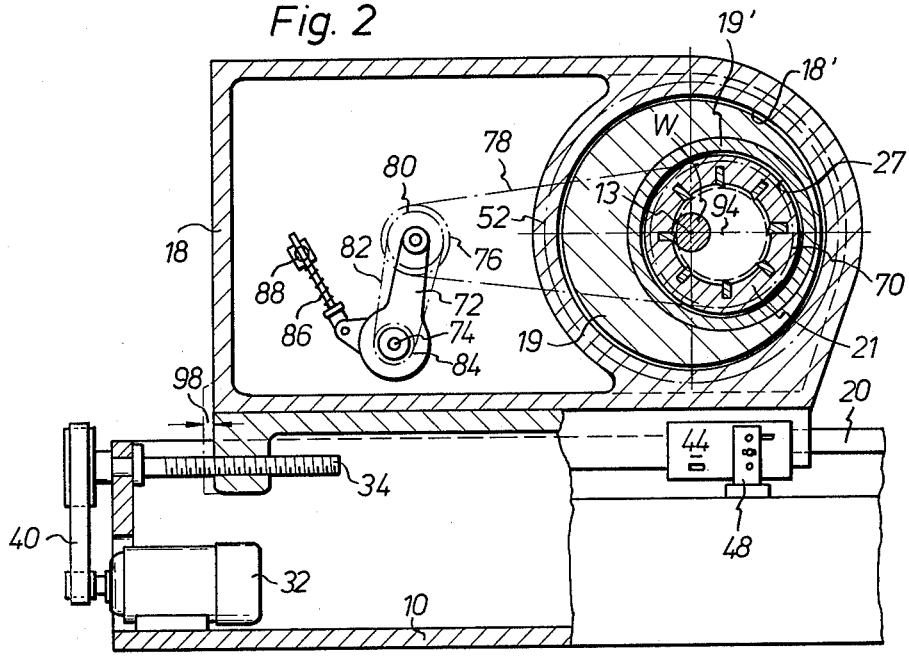

Preferred embodiments of the invention will now be described with reference to the accompanying drawings in which FIG. 1 is a partial vertical longitudinal section through a machine tool equipped with a pair of tool units designed in accordance with the invention, the right hand unit being shown in part only, the plane of section containing the axis of the workpiece and of the annular milling tools of the two tool units;

FIG. 2 is a diagrammatic vertical section taken through the tool unit along a vertical plane extending at right angles to the work axis in which the means for variably adjusting the eccentricity of the eccentric body are omitted and in which the annular milling tool is shown as being located inside of the eccentric body rather than laterally thereof, FIG. 2 being similar to FIG. 4 of the prior U.S. Pat. No. 3,795,161; and FIG. 3 is a side view of the annular milling tool of the left hand tool unit shown in FIG. 1, partly in section along the line 3—3 of FIG. 1.

The machine illustrated in the drawings embodies the invention forming the subject matter of the prior U.S. Pat. No. 3,795,161 referred to herein-above. The disclosure of this prior patent is therefore to be considered as forming part of the description following hereinafter. The reference numerals used in the prior patent are also used hereinafter for the corresponding elements. As described in the prior patent, two longitudinal slides 10 are guided and displaceable on a horizontal guideway along a bed or frame. Only parts of the left-hand slide 10 are shown and the right-hand slide is not shown at all, neither is the bed or frame illustrated. At each of its ends, the bed is formed with an upright (not shown) out of which projects horizontally a substantially cylindrical neck 22, terminating in a centre pin S. A crankshaft K to be machined is mounted between the centres S of both necks 22. In the drawing, only two crankpins of the shaft K are shown, together with their webs. It is to be understood, however, that the crankshaft for a four-cylinder engine comprises two more crankpins which are symmetrically shaped with respect to those illustrated. The crankshaft K is held tight with no play by clamping means (not shown) fixed to the bed so that the crankshaft cannot rotate. The left-hand centre S is displaceably mounted in the axial direction in neck 22 so that the centre can be retracted to the left into the neck and thereby free the workpiece K. The two necks 22 and their centres S are co-axial with the horizontal axis 13 of the crankshaft K. Each of the two longitudinal slides 10 carries a tool unit including a cross-slide 18. For this purpose, each slide 10 is provided on its upper face with a horizontal guideway 20 which extends transversely beneath the axis 13 of the workpiece and on which a broad foot 15 is a cross-slide 18 is guided. The cross-slides 18 form a housing enclosing a cylindrical space whose axis has the same distance from the longitudinal slide 10 as the axis 13 of the workpiece. An eccentric body 19, 19' which carries an annular gear 150 fixed thereto, is rotatably supported in this cylindrical space by means of two thrust bearings 18'. The gear 150 drivably connects the eccentric body 19, 19' to a feed motor by means of gears; the feed motor and the gears will be described below. The feed motor causes the eccentric body 19, 19' to rotate on the ball bearings 18' about axis 50. The eccentric body 19, 19' can be immobilised at a given angular position, as is explained in detail in U.S. Pat. No. 3,795,161. The body 19, 19' encloses a cylindrical cavity and carries two internal ball-bearings 27. The common axis 94 of this internal cavity and of the ball-bearings 27 is spaced at a distance $e$ from axis 50. The two bearings 27 support a tool 21 having internal cutting edges. The tool 21 has at one end an annular gear 70 fixed thereto which is adapted to be driven by an electric motor via intermediate gearing as will be described later. The axis 13 of the crankshaft sections to be machined and the axis 50 of rotation of the eccentric body 19, 19' are spaced equal distances from the guideway 20 and, therefore, coincide in FIG. 1. The drives provided for the two slides 10 and 18, and for the annular tool 21 are designed as described in the U.S. Pat. No. 3,795,161. The drive for the cross-slide 18 comprises the elements 32, 34 and 40 in FIG. 2 and the drive for rotating the annular tool 21 comprises the elements 72—88 in FIG. 2. The drive for imparting rotation to the eccentric body 19 differs from that of the prior patent and will be described further down. It is also explained in this prior patent how the crankshaft K can be positioned in the machine tool and removed therefrom and this being so, a short resume of these two steps is deemed sufficient here.

Figure 3:
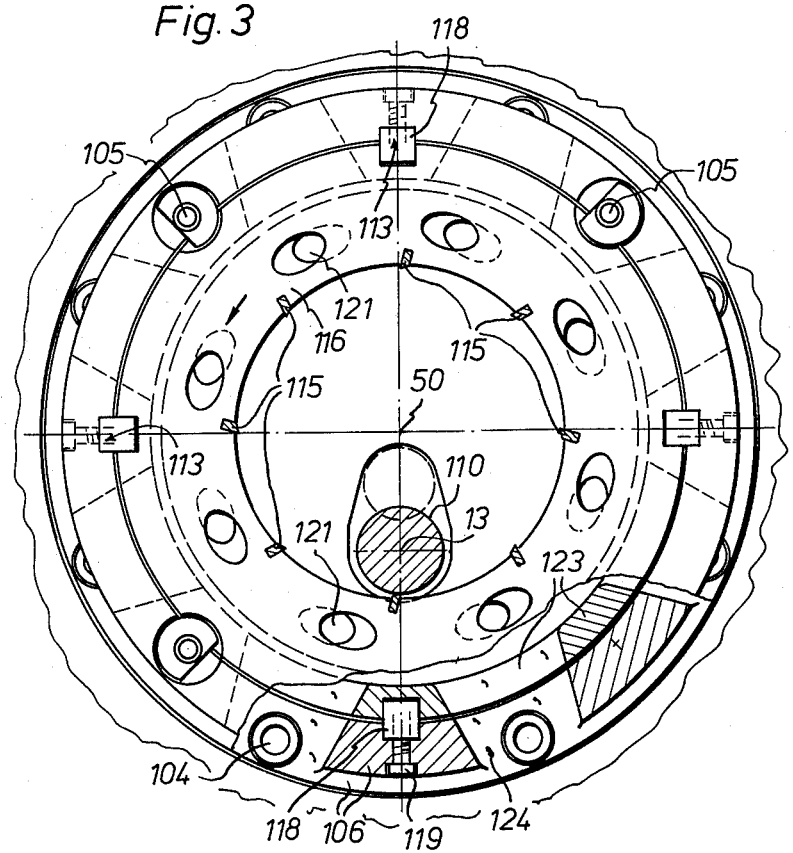

When the eccentric body 19, 19' while rotating on the bearings 18' is brought to a stop at the moment when axis 94 of the tool is situated at the same level as the axis 13 of the workpiece and the axis 50 the cross-slide 18 can be moved to position in which the two axes 13 and 94 coincide as shown in FIG. 3 of the prior patent. When this movement has been effected, the cross-slide is stopped and the longitudinal slide 10 can be moved to the left in the drawing until the annular milling tool 21 encircles the neck 22. Once the other longitudinal slide 10 and the second tool unit have been displaced in the same way, the centres S can be retracted and the workpiece K can be removed transversely to its axis; the tool units do not obstruct this removal.

After a new workpiece has been placed in position in the machine tool and has been clamped, the two longitudinal slides 10 are moved to the machining position shown in the drawing, and the tools 21 begin to rotate. By feeding the cross-slides 18, a plunge cut can be made into the workpiece which is held stationary. The feed movement is arrested as soon as the axis 50 (FIG. 2) of the bearings 18' coincides with the work axis 13. Each eccentric body 19, 19' is then beginning to rotate on the ball bearings 18'. During the rotation, the annular milling tools orbit about the line bearing surfaces of the crankshaft which are to be machined. Once each eccentric body 19, 19' has completed substantially one revolution in this way, a surface on crankshaft K will have been machined all around its circumference.

It will now be explained in what respects the present invention differs from the machine tool of the prior patent.

Whereas in the case of the machine tool of the prior patent, the annular milling tool has only a single circular set of milling teeth or blades in its inside, the tool according to the present invention is provided with at least two such circular sets of teeth or blades and with apertures for the removal or discharge of chips, said apertures being situated between the circular sets of blades, so that a plurality of co-axial surfaces of revolutions can be machined simultaneously on the workpiece.

In the case of the present embodiment of a machine tool according to the invention, the annular tool is composed of a number of parts as will now be described with reference to the left-hand tool unit. The tool 21 includes a sleeve having an internal tapered face 100 and external faces 102 adapted to receive the inner races of the two ball-bearings 27. Mounted on the right-hand end-face of the sleeve is an annular supporting body in form of a bushing 106 secured by screws 104. A plurality of circular sets of internal cutting blades is arranged in the supporting body 106. These cutting blades serve to machine two spaced co-axial crankshaft sections forming bearing journals 108 and 110 as well as two end journals 112 and 114 on that crankshaft, the latter journals having step-wise reduced diameters. The crankshaft K has five spaced co-axial sections constituting line bearings or line journals 108, 110, 130, 132 and 134. All of these line journals are machined simultaneously. The line bearing sections 110 and 112 are machined by the annular milling tool of the first-hand tool unit and the line bearing sections 130, 132 and 134 are machined at the same time by the annular milling tool of the right-hand tool unit.

As shown in FIG. 3 the inner circumferential surface of the bushing 106 is provided with four longitudinal grooves 113 extending parallel to the axis 50 of the bushing 106. Each circular set of cutting blades 115 is carried by an annular element in form of a circular disk 116 which on its outer circumference is provided with four longitudinal grooves registering with the grooves 113 and cooperating therewith in accommodating keys 118 which are fixed to the bushing 106 by screws 119. Each of the grooves and the keys therein have a rectangular cross-sectional profile and is so located as to afford radial heat expansion and contraction to the annular disk 116 with reference to the bushing 106. A clearance is provided between the outer periphery of the disk 116 carrying the blades 115 and the inner periphery of the bushing 106 and this clearance prevents any stresses from being set up in the bushing 106 by heat expansion of the blade-carrying disk 116.

Moreover, the disk 116 is provided with a set of perforations 121 permitting air to circulate therethrough for the purpose of cooling the tool. A second annular cutting element 122 provided with internal cutting blades is mounted within the bushing 106 for common rotation therewith in axially spaced relationship to the disk 116. This second annular cutting element 122 carries three adjacent internal annular sets of cutting blades 120 for machining the journals 118 and the two end journals 112 and 114 of the crankshaft. The annular cutting element 122 has likewise external grooves cooperating with the keys 118 and is capable of heat expansion owing to the provision of a clearance within the bushing 106. A spacer sleeve 123 is inserted inside of bushing 106 between the cutting element 122 and the cutting element 116. This sleeve 123 is provided with apertures registering the apertures 124 of the bushing 106.

The head of each screw 104 is located within an aperture 124 as shown in FIG. 1. The bushing 106 is provided with longitudinal tapped bores for the accommodation of screws 105, FIG. 3, the heads of such screws overlapping the disk 116 to hold the same in contact with the spacer sleeve 123 and this spacer sleeve holds the cutting elements 122 in contact with the end wall of the carrier 21.

The three sets of cutting blades 120 are both axially and radially spaced from each other in conformity with the different diameters of the adjacent journals 108, 112 and 114.

If desired, the cutting element 122 may form three sets of internal fingers each finger carrying a hard metal insert provided with a cutting edge. This is shown in FIG. 1 just above the reference numeral 94.

The bushing 106 is surrounded at its outside by an annular casing 126 which is secured to the cross-slide 18 and which has at the bottom an opening 128 through which the chips can drop out.

The apertures 124 ensure that the chips cut by the cutting blades 115 and 120 which drop into the space between the cutting elements 116 and 122 will drop down as indicated in FIG. 3, and will not clog the interior of the annular milling tool.

FIG. 1 shows that the annular set of cutting blades 120 engaging the pin or line bearing 108 is axially spaced from the set of blades 115 engaging pin 110 a distance which equals the total axial dimension of the crankpin K' therebetween and of the adjoining webs. Moreover, it will be appreciated that the internal diameter of the bushing 106 must be sufficiently large to enable the bushing to accommodate the voluminous crankshaft portion composed of the pins K' and of its adjoining webs.

An alternative design for the annular milling tool according to the invention is shown on the right-hand tool unit of the drawing. An annular body in form of a bushing 106' which corresponds to the bushing 106 carries on its inside three axially spaced annular cutting elements adapted to machine three co-axial shaft bearing journals 130, 132 and 134. The element for machining journal 134 has additionally inserted blades for machining an end flange 136 at its outside and two end journals 138 and 140 of the crank shaft K. Between the elements for machining journals 130, 132 and 134 the bushing 106' is provided with two sets of apertures 142 and 144 for the removal of chips.

A difference between the machine tool according to the present invention and that of the prior art consists in that the eccentric body 19, 19' is formed in two pieces instead of one. It consists of an outer eccentric annular element 19 and an inner eccentric annular element 19' which latter is rotatably mounted in the outer eccentric element 19, with a rotary drive being provided for relative angular displacement of both elements. The radius of the machined surface of the workpiece corresponds to that of the circle on which the machining cutting edges are located less the distance e. If it is desired to change over from rough-cutting to finishing, that is to say to further reduce the radius of the machined surface of the workpiece, then it is necessary either to reduce the radius of the circle of cutting edges — which would create constructional problems — or to increase the distance e. This increase can be brought about by turning the two elements 19, 19' of the eccentric body relative to each other. The two elements will rotate together as a whole whilst machining is in progress, but will be turned relative to each other during the changeover from rough-cutting to finishing, and vice versa.

This relative angular displacement of the elements 19 and 19' is effected as follows.

An annular gear 150 is mounted on and rigidly connected with the outer eccentric element 19. A second annular gear 152 having external teeth 154 and internal teeth 156 is rotatably journalled on the outer eccentric element 19. The pitch circle of the external teeth 154 has the same diameter as the pitch circle of annular gear 150. The internal teeth 156 mesh with external teeth 52 provided on the inner eccentric annular element 19'. Driving means are provided for selectively either driving both gears 150 and 152 synchronously or for driving gear 150 only while arresting gear 152 in stationary condition. In the latter alternative such driving means will angularly displace gear 150 and the outer eccentric annular element 19 fixed thereto relative to the inner eccentric annular element 19' which is held against rotation by the stationary gear 152. Therefore, during the rotation of the eccentric body 19, 19' and the consequent orbiting motion of the annular milling tool about the work, the distance e of the tool axis 94 from the axis 50 of the eccentric body 19, 19' may be either held stationary or may be changed.

A needle bearing 158 is interposed between the eccentric annular element 19 and 19'.

The driving means for optionally driving either gear 150 only or both gears 150 and 152 synchroneously will now be described in detail. A horizontal axle 160 is mounted in the cross-slide 18 at a level above the ball-bearings 18' extending parallel to the axis 50. This shaft carries freely rotatable gears 162 and 164. Gear 162 meshes with the external teeth 164 of gear 152 and gear 164 meshes with gear 150. A drive shaft 166 is rotatably journalled in the cross-slide 18 at a level higher than that of axle 160 and extending parallel thereto. A gear 168 fixed to one end of shaft 166 meshes with gear 164 and with a pinion 170 fixed to a shaft of an electric motor 172. This motor is mounted on the cross-slide 18 and serves to impart rotation to the eccenter element 19' via the train of motion transmitting gears 170, 168, 164, 150. A clutch sleeve 174 is journalled on the other end section of shaft 166 and is shiftable thereon to one or the other of two end positions. This sleeve, if in the right-hand end position with reference to FIG. 1, engages a clutch section 176 keyed to shaft 166. As a result, the clutch sleeve 174 will be driven synchronously with gear 168. When shifted to the left-hand end position, clutch sleeve 174 engages a brake disk 179 fixed to the cross-slide 118. As a result, the clutch sleeve 174 will be held stationary. The clutch sleeve 174 has a set of external gear teeth in mesh with the gear 162. Therefore, the elements 174, 162 and 152 constitute a second set of motion transmitting elements for transmitting motion from the drive shaft 166 to the inner eccentric annular element 19' driving the same in synchronism with element 19.

A first cam 180 is fixed to the drive shaft 166 to operate an electrical switch 177 and a second cam 182 is fixed to the clutch sleeve 174 to actuate an electrical switch 178. The switch 177 has the same function as switch 68 shown in the prior patent. Suitable electrical circuit means including switch 177 are capable of stopping motor 172 at the instant when the orbiting axis 94 of the milling tool will have reached the same distance from the horizontal guideway 20 as have the coinciding axes 50 and 13 of the eccenter body 19, 19' and the work. The electrical circuit means includes a counter operated by switch 177. Similarly, cam 181 controls a switch 178 which forms part of an electrical control means including a second counter and determining the period of time during which the train of motion transmitting elements 174, 162 and 152 is kept stationary and arrests the inner eccentric element 19' while the outer eccentric element 19 rotates. As a result, the switch 178 serves to control the angular displacement that will be effected between the eccentric annular elements 19 and 19' while clutch sleeve 174 is in its left-hand position. The means for this selective displacement of the clutch sleeve 174 are not shown. They are well-known in the art.

A further difference between the novel machine tool and that of the prior art consists in that one of the orbiting tools including bushing 106 rotates about its axis 94 in a direction opposite to that in which the other orbiting tool and its bushing 106' revolves about its axis 51. In addition, the two axes 94 and 51 are arranged diametrically opposite each other with respect to the axis 13 of the workpiece. This results in that upon revolving about the axis 13, the two axes 94 and 51 will always be circumferentially spaced apart by 180° on their respective orbits. Thus the cutting blades carried by bushing 106 press against the machined surface of the workpiece in the same direction in which the cutting blades mounted on bushing 106' press against another machined surface of the workpiece. The effect of this arrangement can easily be seen from FIG. 1 which shows the cutting blades in their operative positions. Assuming that the left-hand tool including the bushing 106 revolve in a clockwise direction (looking from the left), then the cutting blades carried by this tool move, so to speak, away from a person looking at the drawing. If then the cutting blades carried by the bushing 106' rotate in the counter-clockwise direction (again looking from the left) then these cutting blades will also move away, so to speak, from a person looking at the drawing. Both cutting blades move therefore in substantially parallel directions whilst they are in engagement with machined surfaces. Hence the blades will exert opposite bending moments on the workpiece which will balance each other more or less. Since the crank of the workpiece shown in FIG. 1 is firmly held by clamping means in a stationary position, the result will be that the bending loads exerted on the workpiece during machining by both orbiting tools will be as favourable as possible.

The annular tools may consist of grinding material. An annular grinding disk with a grinding face on its inside constitutes an annular tool with internal cutting edges since the granules of grinding material form the cutting edges on the inside of the annular tool.

The method of roughing and finishing the work by means of the machine illustrated in FIGS. 1 and 2 is briefly the following. When the bed slides 10 are in such an inoperative position on the frame or bed provided with the cylindrical necks 22 that the annular supporting bodies 106 and 106' surround these necks, the machine is charged with the crank of a crankshaft and the same is firmly clamped in stationary non-rotating position on the frame between the center S. Thereupon the longitudinal slides 10 are moved to their operative positions such as shown in FIG. 1 in which the cutting blades carried by the annular supporting bodies 106 and 106' are slipped over the crankshaft from the ends thereof into positions in which the circular sets of blades register with the crankshaft sections to be machined. When the bed slides are in their inoperative positions and are moved therefrom to their operative positions, each cross-slide 18 and the eccentric body 19, 19' thereon are so adjusted as to cause the axis 94, or 51 respectively, to coincide with the axis 13 of the crankshaft. Therefore, each annular set of cutting blades surrounds the crankshaft section in registry therewith in co-axial relationship. As a result, the cranks of the crankshaft will not interfere the cutting blades during the travel of the bed slides 10 to inoperative or operative position, as shown in FIG. 3 of the prior patent.

After the bed slides have been stopped in their operative positions, rotation will be imparted to the annular tools by starting the motor driving shaft 74 in FIG. 2. It may be mentioned here that while FIG. 2 indicates an endless chain by the dash-dotted line 78, a set of gears has been substituted for the chain 78 in the embodiment shown in FIG. 1. After rotation has been imparted to the annular tool element 21, the motor 32 is started to impart feed motion to the cross-slide 18 and to the tool element 21 travelling in unison therewith from the position in which the axes 94 and 13 coincide to the position shown in FIG. 2 in which the axes 50 and 13 coincide. During this feed motion the internal cutting blades of the tool element 21 will take a plunge cut into the coordinated crankshaft section cutting therefrom a crescent-shaped recess. The control means 44 and 48 shown in FIG. 2 will stop this plunge feed of cross-slide 18 when the axis of bearing 18' of the cross-slide will have travelled to the FIG. 2 position. When this position has been reached and the cross-slide 18 has been stopped, the motor 172 in FIG. 1 will be started with the clutch sleeve 174 in its right-hand position to impart rotation to the eccenter body 19, 19' which, in its turn, will impart an orbiting motion to the tool 21 in which the axis 94 thereof will travel around the axis 13 on a circular path. As a result, the cutting blades of the tool 21 will take a circumferential cut from the work W in which the crescent-shaped recess will progress circumferentially around the work W until, after an orbiting travel of 360° of the tool, the entire circumference of the work W will have been roughed. As the next step of the method the distance e between the axes 94 and 13 will be increased by an amount corresponding to the depth of a finishing cut. This is effected by a temporary shifting of clutch sleeve 174 into engagement with the brake disk 179. The orbiting motion of the tool axis 94 about the work W is continued after the tool axis has travelled at least once around the axis 13 while the clutch sleeve 174 engages the brake disk 179. As soon as the proper length of the distance e has been reached, the electrical control means including the switches 177 and 178 will respond thereto and cause the clutch sleeve 174 to be moved back into engagement with clutch section 176 again. As a result, the orbiting motion of the tool is continued through at least 360° whereby the circumferential finishing cut is taken from the work. Then, the motor 172 is stopped, the cross-slide 18 is returned to its starting position and the eccenter body 19 will be turned by motor 172 to the position in which the tool axis 94, or 51 respectively, is on the same level with axis 50. The bed slides 10 are then moved to their inoperative positions in which the crankshaft may be released and discharged from the machine.

While the machine shown in FIG. 1 is so designed as to simultaneously machine the five line bearing sections of the crankshaft, it may be likewise used for the simultaneous cutting operation on a set of co-axial crankpins, provided that the crankshaft is so clamped in position as to hold the crankpins on the same level as the axis 13 of the line bearing sections.

The embodiments of the present invention described hereinabove are capable of numerous other modifications within the scope of the appended claims.

What I claim is:

1. A machine tool for roughing and finishing at least one section of a crankshaft comprising a frame, supporting means on said frame rigidly supporting said crankshaft in stationary condition, guideway means on said frame extending transversely to the work axis of said crankshaft sections at a distance therefrom, a tool unit mounted for travel on said guideway means, an annular rotary tool of the type having internal cutting edges located on at lleast one circle about a first axis, an eccentric body rotatably mounted in said tool holder for rotation about a second axis, bearing means for journalling said annular tool in said eccentric body for rotation about said first axis, said second axis and said work axis being parallel and equally spaced from said guideway means, first driving means connected with said annular tool for imparting rotation thereto determining the cutting speed of said cutting edges, second driving means for imparting a feed motion to said tool unit, relative to said guideway means for a plunge cut of said cutting edges into the work, third driving means for imparting rotation to said eccentric body after said plunge cut has been effected for causing said annular rotary tool to orbit about said work and to take a circumferential roughing cut from the work, said eccentric body being composed of a pair of annular eccentric elements mounted in nested relationship for relative angular displacement varying the distance of said first axis from said second axis, and actuating means connected to said eccentric annular elements for so effecting said angular displacement after said circumferential roughing cut has been taken as to increase the distance of said first axis from said second axis for the purpose of causing said cutting edges to take a finishing circumferential cut from the work, means for so controlling said third driving means as to cause them to rotate said eccentric body into a position in which said first axis is substantially in a common plane with said second axis and said work axis, and means to so control said second drive means as to stop the tool unit in a position in which said second axis coincides with said work axis after said plunge cut.

2. A machine tool as claimed in claim 1 in which said annular rotary tool has an annular body member and a plurality of annular sets of cutting blades mounted therein in axially spaced relationship for common rotation therewith, said body member being provided with apertures comunicating with the space between said annular sets of cutting blades for the discharge of chips therefrom, whereby a plurality of co-axial sections of the crankshaft can be cut simultaneously.

3. A machine tool as claimed in claim 1 in which said third driving means and said actuating means comprise a drive shaft; a first train motion transmitting element connecting said drive shaft to one of said annular eccentric elements, a second train of motion transmitting elements connected to the other one of said annular eccentric elements, a stationary braking element and clutch means connected with said second train and coordinated to said drive shaft for alternatively coupling said second train to said drive shaft or connecting said second train to said stationary braking element for the purpose of arresting said second eccentric annular element while said first eccentric annular element is driven by said drive shaft.

4. A machine tool as claimed in claim 3 further comprising a first switch actuating element geared to one of said trains of motion transmitting elements and a second switch actuating element geared to the other one of said trains of motion transmitting elements.

5. A method of machining a section of a crankshaft by means of an annular tool having internal cutting teeth comprising the steps of mounting said crankshaft in stationary condition, slipping said tool over said crankshaft from one end thereof into a position in which it surrounds said section, imparting rotation to said tool about its own axis, imparting a plunge feed motion to said tool in a direction transversely to said crankshaft, stopping said plunge feed motion when said cutting teeth have taken a roughing cut from one side of said crankshaft section, imparting an orbiting motion to said annular tool in which the axis thereof performs a circular path about the axis of said crankshaft section to advance the roughing cut circumferentially around said crankshaft section, continuing said orbiting motion after said tool axis has travelled at least once around the axis of said workshaft section while increasing the distance of said axes by an amount corresponding to the depth of a finishing cut and again causing said tool to orbit about said crank shaft section substantially once to take a circumferential finishing cut from said crankshaft section.

6. A machine tool for machining a crankshaft comprising a bed, stationary work holding means on said bed for supporting a crankshaft at its ends and at a point between said ends, a pair of rotary annular tools having internal cutting edges, at least one of said tools being formed by a bushing having an internal diameter sufficient for the accomodation within the bushing of a crank pin and of the adjoining crank arms and by a plurality of axially spaced circular sets of cutting inserts mounted on the inside of said bushing for simultaneously machining at least two co-axially disposed crank shaft pins, a pair of tool holders on said bed, each tool holder including one of said tools, means for producing a relative rotary cutting motion between said tools and said crankshaft, whereby said tools are capable of simultaneously engaging and machining a plurality of coaxial pins of said crankshaft, of which at least two pins are located on opposite sides of said points, said bushing being provided with apertures (124, 142, 144) between said sets of cutting inserts for the discharge of chips.

* * * * *